United States Patent Office 3,672,747
Patented June 27, 1972

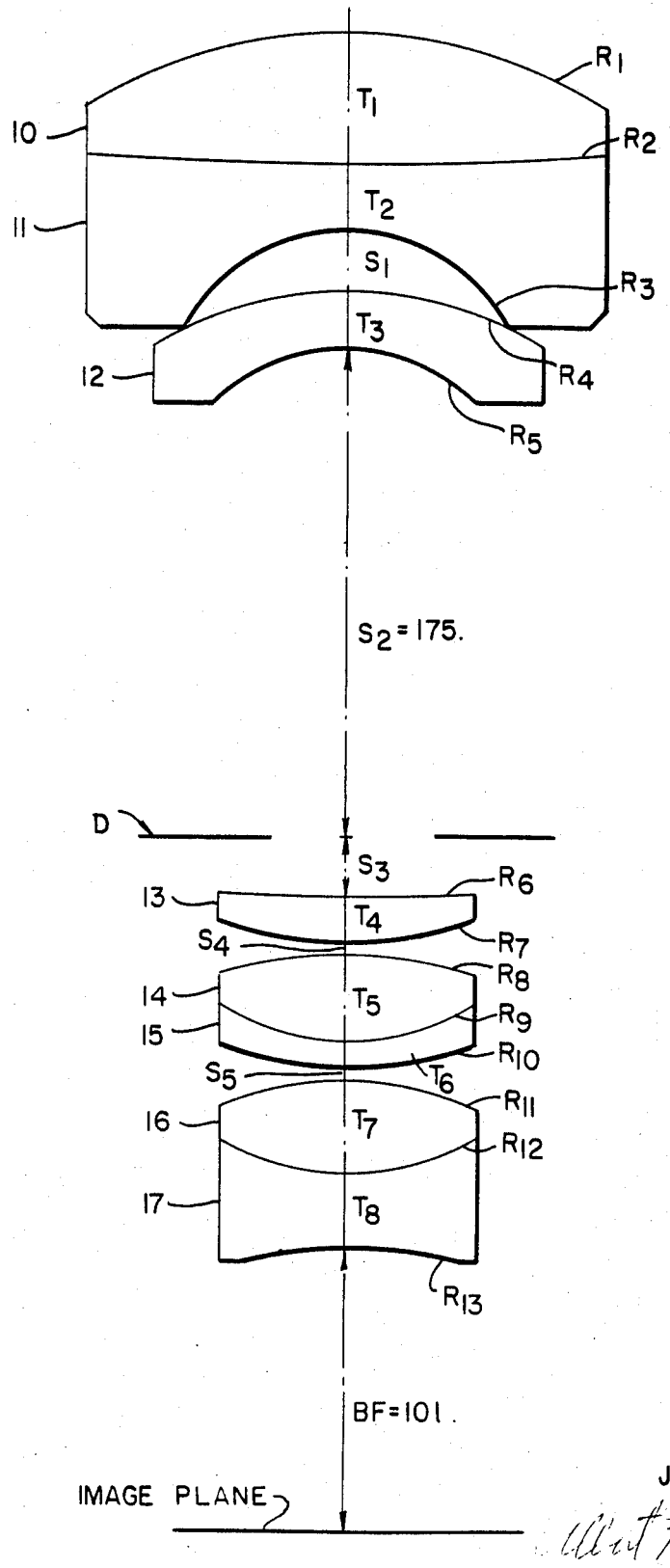

3,672,747
OBJECTIVE LENS FOR SHORT FOCAL LENGTH CAMERAS AND PROJECTORS
John R. Miles, Elk Grove Village, Ill., assignor to Retention Communications Systems, New York, N.Y.
Filed Nov. 13, 1970, Ser. No. 89,287
Int. Cl. G02b 9/60
U.S. Cl. 350—216                                                    1 Claim

ABSTRACT OF THE DISCLOSURE

An objective lens designed for cameras and projectors for short focal length applications of the order of 1 cm. but having lens components which are relatively large and comparatively easy to manufacture. The system has a speed of $f/2$ and a back focal length equal to 101.1% of the focal length of the lens. There is a central space equal to 1.75F for positioning a shutter.

BACKGROUND OF THE INVENTION

The use of small 16 mm. and 8 mm. motion picture film requires camera and projection lenses of short focal length, of the order of 8 mm. and lower. Prior lenses for such use included components so small that their manufacture and assembly was quite expensive and included minute spacers and lens supports made to quite small tolerances.

The present invention is a less system having much larger components, larger spacings, and ample room for a shutter and a film guiding mechanism. All the aberrations have been reduced to a small value which is less than the diffraction produced by the diaphragm.

One of the features of the present invention is the separation of the lens components into two groups, a first group including three components and having an overall negative power. A second group of five lenses has a positive power slightly greater than the power of the first group.

Other features of the present invention will be disclosed in the following description taken in connection with the accompanying drawing.

BRIEF DESCRIPTION OF THE FIGURE

The figure is a somewhat diagrammatic cross sectional view of all the lens components making up the system, showing the position of the diaphragm and the image plane.

DESCRIPTION OF THE PREFERRED EMBODIMENT

The lens system according to the present invention includes a first group comprising an entrance lens 10 of positive power cemented to a second component 11 of negative power. A third component 12 has a negative power and is in contact with the second lens 11 but not cemented to it. Lens 10 is a double convex flint element which is cemented to element 11, a double concave crown lens. The two differing glasses are used to correct the lateral chromatic aberration by the difference in dispersion. The combination also aids substantially in the correction of the distortion by the cemented surface between the two elements. It should be noted that the cemented surface is presented to the entrance light bundles at an opposite angle relative to the angle of the other refracting surfaces. The total power of the elements 10 and 11 is negative which shortens the focal length of the system and aids in correcting the astigmatism of the system.

The third lens element 12 is a convex-concave negative lens and also aids in shortening the focal length and correcting astigmatism. The third element is made of light flint glass having low dispersion. The negative power is distributed between the first three components so that their shapes and powers can be used to reduce the higher order aberrations. In the present invention, the second surface of the element 11 has a radius of curvature which is 52 percent of the radius of curvature of the first surface of lens element 12. These two surfaces are adjusted so that the third element is mounted in contact with the second element, thereby eliminating the mechanical spacer between them.

The second group of lenses is spaced some distance from the first group and includes a positive element 13 of heavy crown glass. Element 13 is followed by a cemented doublet including a double convex crown lens 14 and a negative flint lens 15. A final component is another cemented doublet including a bi-convex crown glass lens 16 and a bi-concave flint glass element 17. The last two cemented doublets are used to correct for the on-axis chromatic aberration while the shapes of all these elements in the second group is primarily to correct for spherical aberration and coma.

In further detail, the values for the constructional data are given in the following table, where all the lengths are in units relative to the focal length of 100.

| Lens | Radius $f=100$ | Thickness (t) Air Space (s) | Glass | Refractive Index ($N_d$) | Dispersion (v) |
|---|---|---|---|---|---|
| 10 | $R_1=174.$ | $t_1=47.2$ | F | 1.757 | 47.8 |
|    | $R_2=-1548.7$ | $t_2=23.5$ | | | |
| 11 | $R_3=68.7$ | $s_1=21.5$ | C | 1.501 | 56.4 |
|    | $R_4=131.6$ | $t_3=20.1$ | LF | 1.620 | 38.1 |
| 12 | $R_5=70.8$ | $s_2=175.$ | | | |
|    |            | $s_3=21.7$ | | | |
| 13 | $R_6=-1779$ | $t_4=15$ | F | 1.733 | 51.6 |
|    | $R_7=-220.9$ | $s_4=6.7$ | | | |
|    | $R_8=214.4$ | $t_5=29.6$ | C | 1.517 | 64.1 |
| 14 | $R_9=-88.2$ | | | | |
| 15 | $R_{10}=-139.4$ | $t_6=9.7$ | F | 1.689 | 31.2 |
|    | $R_{11}=118.7$ | $s_5=5.0$ | | | |
| 16 | $R_{12}=-96.$ | $t_7=32.7$ | C | 1.501 | 56.4 |
| 17 | $R_{13}=140.2$ | $t_8=26.7$ | F | 1.648 | 33.8 |

NOTE.—Where F=flint, C=crown, and LF=light flint.

The spacings $s_2$ and $s_3$ define the preferred position of a diaphragm and a shutter if used. The back focal length is 100. This is the distance from the last glass surface on the axis to the image plane and is equal to the focal length in this lens system.

The positive over-all power of the second group of lenses is approximately equal to the negative power of the first group of lenses. This balance is used to reduce the astigmatism of the system when the field curvature of the objective is also corrected. The substantial separation between the two groups also causes the light beams to focus on the image plane and give the system its desired focal length.

Having thus fully described the invention, what is claimed as new and desired to be secured by Letters Patent of the United States is:

1. An objective lens constructed in accordance with the present invention comprising the lens elements as set forth in the following table:

| Lens | Radius $f=100$ | Thickness (t) Air Space (s) | Glass | Refractive Index ($N_d$) | Dispersion ($v$) |
|---|---|---|---|---|---|
| 10 | $R_1=174.$ | $t_1=47.2$ | F | 1.757 | 47.8 |
|    | $R_2=-1548.7$ | $t_2=23.5$ |   |   |   |
| 11 | $R_3=68.7$ | $s_1=21.5$ | C | 1.501 | 56.4 |
| 12 | $R_4=131.6$ | $t_3=20.1$ | LF | 1.620 | 38.1 |
|    | $R_5=70.8$ | $s_2=175.$ |   |   |   |
|    |   | $s_3=21.7$ |   |   |   |
| 13 | $R_6=-1779$ | $t_4=15$ | F | 1.733 | 51.6 |
|    | $R_7=-220.9$ | $s_4=6.7$ |   |   |   |
|    | $R_8=214.4$ | $t_5=29.6$ | C | 1.517 | 64.1 |
| 14 |   |   |   |   |   |
| 15 | $R_9=-88.2$ | $t_6=9.7$ | F | 1.689 | 31.2 |
|    | $R_{10}=-139.4$ | $s_5=5.0$ |   |   |   |
|    | $R_{11}=118.7$ |   |   |   |   |
| 16 | $R_{12}=-96.$ | $t_7=32.7$ | C | 1.501 | 56.4 |
| 17 | $R_{13}=140.2$ | $t_8=26.7$ | F | 1.648 | 33.8 |

NOTE.—Where F=flint, C=crown, and LF=light flint.

References Cited

UNITED STATES PATENTS 3,064,533   11/1962   Hudson ............... 350—214
2,548,569   4/1951   Tolle ............... 350—216 X JOHN K. CORBIN, Primary Examiner